United States Patent
Gao et al.

(10) Patent No.: US 10,243,378 B2
(45) Date of Patent: Mar. 26, 2019

(54) DISCHARGE PROTECTION CIRCUIT AND ITS CONTROL METHOD

(71) Applicant: Chervon (HK) Limited, Wanchai (HK)

(72) Inventors: Qing Gao, Nanjing (CN); Zheng Geng, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 377 days.

(21) Appl. No.: 14/751,681

(22) Filed: Jun. 26, 2015

(65) Prior Publication Data

US 2015/0380960 A1   Dec. 31, 2015

(30) Foreign Application Priority Data

Jun. 30, 2014 (CN) .......................... 2014 1 0306024

(51) Int. Cl.
H02J 7/00 (2006.01)

(52) U.S. Cl.
CPC .......... H02J 7/0029 (2013.01); H02J 7/0063 (2013.01); *H02J 2007/004* (2013.01); *H02J 2007/0067* (2013.01)

(58) Field of Classification Search
CPC .................................................... H02J 7/0029
USPC ............................................................ 320/136
See application file for complete search history.

(56) References Cited

U.S. PATENT DOCUMENTS

| 2009/0202890 A1* | 8/2009 | Takeda | H01M 2/34 429/62 |
| 2013/0099755 A1* | 4/2013 | Lei | H02H 7/18 320/134 |
| 2014/0055095 A1* | 2/2014 | Kim | H02J 7/0029 320/134 |

\* cited by examiner

*Primary Examiner* — Richard V Muralidar
(74) *Attorney, Agent, or Firm* — Greenberg Traurig, LLP

(57) ABSTRACT

A discharge protection circuit has a cell combination with more than one cell, a power supply circuit, an output circuit, a MCU chip, a voltage detection circuit, a NTC circuit, a current detection circuit, a drive circuit and a drive switch. The power supply circuit, the output circuit and the cell combination form a series connection and the MCU chip forms an electrical connection with the voltage detection circuit, the drive circuit and the current detection circuit, respectively, with the voltage detection module being electrically connected with the cell combination and the NTC circuit respectively. A control method includes enabling a discharge procedure of the discharge protection circuit to discharge with a power quantity 0.2 times nominal power quantity each hour. In this procedure, the MCU chip is cyclically dormant to reduce the control power dissipation and improve discharge quantity while achieving discharge protection of the battery pack.

5 Claims, 2 Drawing Sheets

DISCHARGE PROTECTION CIRCUIT AND ITS CONTROL METHOD

RELATED APPLICATION INFORMATION

This application claims the benefit of CN 201410306024.X, filed on Jun. 30, 2014, the disclosure of which is incorporated herein by reference in its entirety.

BACKGROUND

The following generally relates to a circuit and its control method, and more specifically, to a discharge protection circuit and its control method.

In a discharge circuit comprising a battery pack and an electrical tool, particularly in a discharge circuit comprising a battery pack with a plurality of cells, high voltage and large heat generation, a MCU chip for intelligent protection and a PCBA assembly for supporting the MCU chip are usually provided to achieve discharge protection. However, since the MCU chip has a higher clock frequency and needs to perform many kinds of detection and control, a larger portion of power of the battery pack is consumed on intelligent control of the PCBA assembly. When the discharge circuit performs discharge in a small current for a long time period, the quantity of power capable of being discharged is substantially reduced, the energy is wasted, and a user's demand is difficult to meet.

SUMMARY

In order to overcome drawbacks in the prior art, the following describes an improved discharge protection circuit and its control method which are capable of reducing the control power dissipation and improving discharge quantity.

In order to achieve the above object, an exemplary discharge protection circuit comprises a cell combination having more than one cell, a power supply circuit, an output circuit, a MCU chip, a voltage detection circuit, a NTC circuit, a current detection circuit, a drive circuit and a drive switch. The power supply circuit, the output circuit and the cell combination form a series connection and the MCU chip forms an electrical connection with the voltage detection circuit, the drive circuit and the current detection circuit respectively. The voltage detection module is electrically connected with the cell combination and the NTC circuit respectively. The drive switch comprises two switch ends and a control end with the two switch ends of the drive switch being connected in series between the output circuit and the cell combination. The current detection circuit is electrically connected to a circuit between the output circuit and the switch ends of the drive switch and the drive circuit is electrically connected to the control end of the drive switch to control turn-on and turn-off of the two switch ends.

Furthermore, the power supply circuit is preferably located on a high-voltage side of the output circuit, and the drive switch is preferably located on a low-voltage side of the output circuit.

Furthermore, the cell combination may comprise more than one series-connected unit, the different series-connected units forming a series connection there between, each series-connected unit comprising more than one cell, and the cells in the same series-connected unit are connected in parallel with a plurality of voltage sampling circuits being disposed between the voltage detection circuit and the cell combination, each voltage sampling circuit being provided with a sampling control switch, and the voltage sampling circuit being electrically connected to a high-voltage end of the series-connected unit.

Furthermore, when one sampling control switch is turned on, the remaining sampling control circuits may all be turned off.

Furthermore, the drive switch may be a MOSFET switch.

There is also described a control method of a discharge protection circuit where the discharge protection circuit is as described above, and the control method at least comprises a discharge procedure of enabling the discharge protection circuit to discharge with a power quantity 0.2 times nominal power quantity each hour.

Furthermore, the control method may at least initialize the MCU chip and cyclically control the MCU chip where the MCU chip in one cycle at least has an operation time period and a dormant time period.

Furthermore, the length of time of the dormant time period may be 5 to 20 times the length of time of the operation time period.

Furthermore, the control method in the operation time period may at least detect a voltage of the cell combination, detect a discharge current, detect a temperature of the cell and control the drive switch.

Furthermore, the length of time of the dormant time period may be 10 times the length of time of the operation time period.

As will become apparent, the described embodiments are advantageous in that the MCU chip is made cyclically dormant to reduce the control power dissipation and improve discharge quantity while achieving the discharge protection of the battery pack.

DETAILED DESCRIPTION

Figure 1:
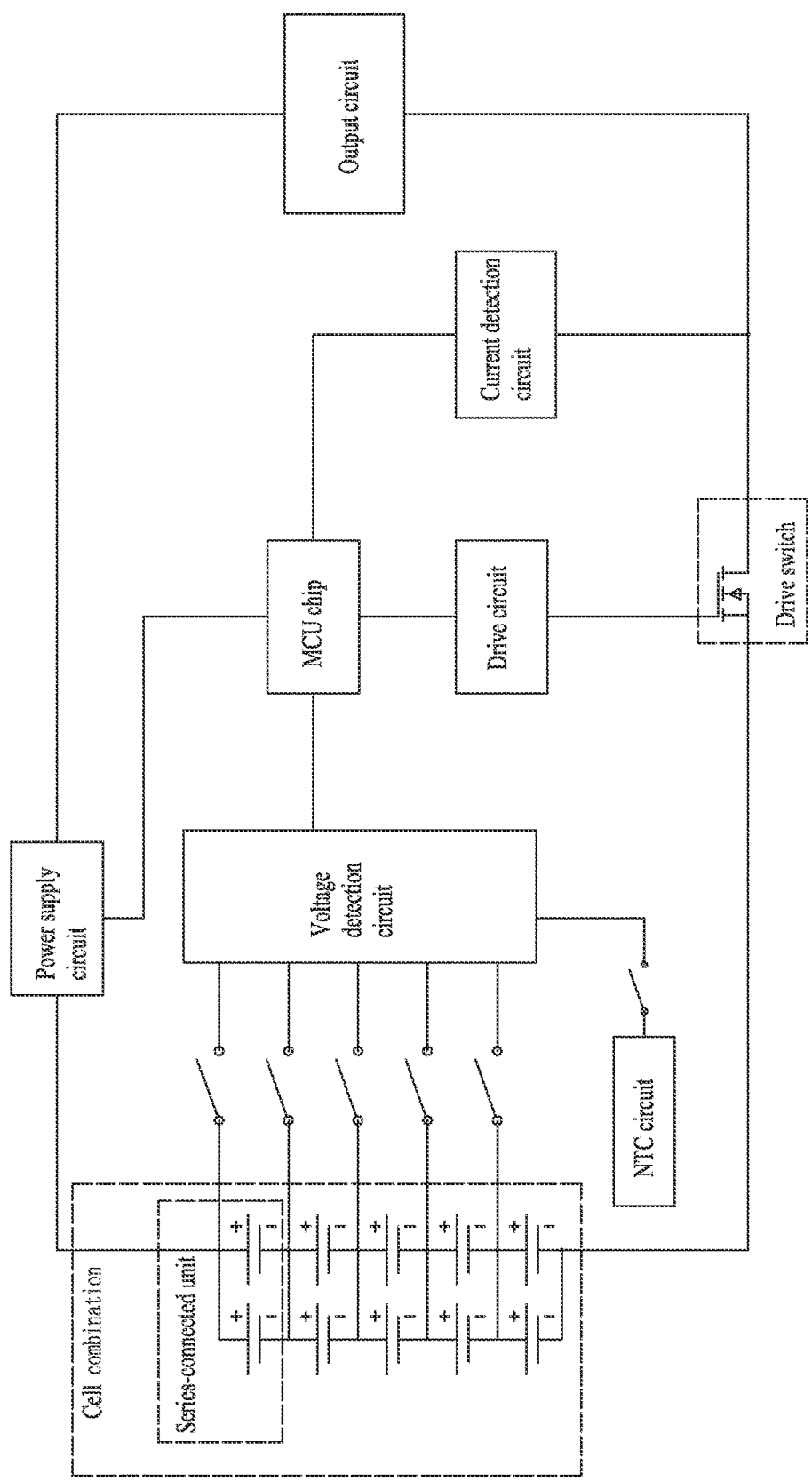
FIG. 1 is a schematic view of an exemplary embodiment of a discharge protection circuit constructed according to the description which follows.

Referring to FIG. 1, an exemplary discharge protection circuit includes a cell combination comprising more than one cell, a power supply circuit, an output circuit, a MCU chip, a voltage detection circuit, a NTC circuit, a current detection circuit, a drive circuit and a drive switch.

The power supply circuit, the output circuit and the cell combination form a series connection and the MCU chip forms an electrical connection with the voltage detection circuit, the drive circuit and the current detection circuit respectively.

The power supply circuit is used to achieve adjustment of voltage and current so that the MCU chip and the output circuit can obtain a desired electrical energy supply.

The voltage detection module is electrically connected with the cell combination and the NTC circuit respectively. The drive switch comprises two switch ends and a control end, and the two switch ends of the drive switch are connected in series between the output circuit and the cell combination, wherein one switch end is connected to a negative pole of the cell combination, and the other one is connected to the output circuit. The current detection circuit is electrically connected to a circuit between the output circuit and the switch ends of the drive switch, and the drive circuit is electrically connected to the control end of the drive switch to control the turn-on and turn-off operations of the two switch ends.

At least one power load is disposed in the output circuit to implement discharge. The MCU chip is mainly used to implement intelligent control. The voltage detection circuit is mainly used to detect the voltage of the cell combination. The NTC circuit is at least provided with a NTC element which is spatially proximate to the cell combination and configured to convert a temperature change nearby the cell combination to a voltage change and feed it back to the MCU chip. The current detection circuit is mainly used to detect whether the discharge current is abnormal. The drive switch and the drive circuit are mainly used to enable the MCU chip to control the turn-on and turn-off operations of the discharge circuit with a certain duty cycle so as to achieve current control for a power load such as a motor.

As a preferred solution, the power supply circuit is located on a high-voltage side of the output circuit, and the drive switch is located on a low-voltage side of the output circuit. As such, even though the drive switch is turned off, the power supply circuit can still supply power to the MCU chip.

As a preferred solution, the cell combination comprises more than one series-connected unit, and different series-connected units form a series connection there between. Each series-connected unit comprises more than one cell, and cells are connected in parallel in the same series-connected unit. A plurality of voltage sampling circuits are disposed between the voltage detection circuit and the cell combination, each voltage sampling circuit is provided with a sampling control switch, and the voltage sampling circuit is electrically connected to a high-voltage end of the series-connected unit. When one sampling control switch is turned on, the remaining sampling control circuits are all turned off. An advantage of so doing lies in that upon discharge, discharge of each series-connected unit and even each cell is not absolutely average, so detection and monitoring is preferably performed for the voltage of each series-connected unit. When each sampling control switch is turned on in turn, the voltage detection module may, by detecting voltage data each time, calculate a total voltage value of the cell combination and a voltage value of each series-connected unit.

As a preferred solution, the drive switch is a MOSFET switch.

The control method of the discharge protection circuit mainly controls the discharge protection circuit as described above. Generally speaking, the control method at least comprises a discharge procedure of enabling the discharge protection circuit to discharge with a power quantity 0.2 times nominal power quantity each hour.

Figure 2:
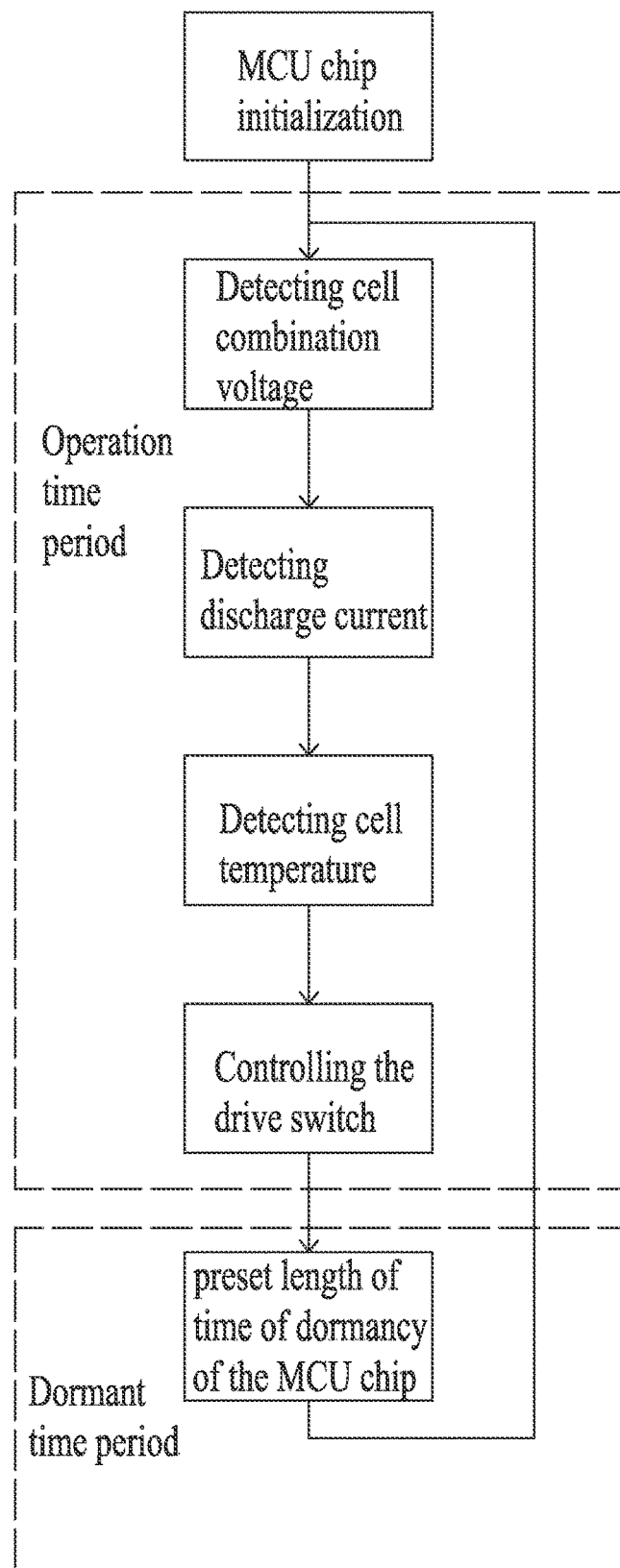
FIG. 2 is a block diagram of an exemplary control method of the discharge protection circuit of FIG. 1.

In order to achieve control of the discharge procedure, as a preferred solution as shown in FIG. 2, the control method at least comprises the following steps: MCU chip initialization and MCU chip cyclic control, wherein the MCU chip in a cycle of the MCU chip cyclic control at least has an operation time period and a dormant time period.

Specifically, the length of time of the dormant time period is 5 to 20 times the length of time of the operation time period, preferably 10 times. As a specific solution, the length of time of the dormant time period is 6 seconds, and the length of time of the operation time period is 0.6 seconds.

Referring to FIG. 2, as a preferred solution, the control method in the operation time period at least comprises the following steps executed in turn: detecting a cell combination voltage, detecting a discharge current, detecting a cell temperature and controlling the drive switch.

In the detection of the cell combination voltage, the MCU chip controls the voltage detection circuit to monitor the voltage of the cell combination; in the detection of the discharge current, the MCU chip controls the current detection circuit to collect sample current and feed a detection result back to the MCU chip; in the detection of the cell temperature, the MCU chip controls the voltage detection circuit to detect voltage in the NTC circuit and feed it back to the MCU chip after detection; after completing the above control links, the MCU chip controls the drive switch via the drive circuit. Noticeably, even though the MCU chip is in a dormant state, the drive switch may be in a state turning on two switch ends to allow the discharge circuit in a discharge state. The only thing is that at this time, the MCU chip does not perform the control of detection and protection.

The above illustrates and describes basic principles, main features and advantages of the present invention. Those skilled in the art should appreciate that the above embodiments are not intended to limit the claimed invention in any form. Rather, technical solutions obtained in a way of equivalent substitution or equivalent variations are all intended to fall within the scope of the claims presented hereinafter.

What is claimed is:

1. A discharge protection circuit of a battery pack and an electrical tool, the battery pack having a cell combination comprising a plurality of battery cells, the discharge protection circuit comprising:

a power supply circuit, an output circuit, a MCU chip, a voltage detection circuit, a NTC circuit, a current detection circuit, a drive circuit and a drive switch;

the power supply circuit, the output circuit and the cell combination forming a series connection, the MCU chip forming an electrical connection with the voltage detection circuit, the drive circuit and the current detection circuit respectively, and the voltage detection module being electrically connected with the cell combination and the NTC circuit respectively, the drive switch comprising two switch ends and a control end, the two switch ends of the drive switch being connected in series between the output circuit and the cell combination, the current detection circuit being electrically connected to a circuit between the output circuit and the switch ends of the drive switch, and the drive circuit being electrically connected to the control end of the drive switch to control turn-on and turn-off operations of the two switch ends, wherein the MCU chip comprises a cycle time, wherein within the cycle time, the MCU chip comprises at least an operation time period and a dormant time period, and wherein the length of the cycle time of the dormant time period is 5 to 20 times the length of the cycle time of the operation time period, so as to enable the discharge protection circuit to discharge with a power quantity 0.2 times nominal power quantity each hour.

2. The discharge protection circuit according to claim 1, wherein the power supply circuit is located on a high-voltage side of the output circuit and the drive switch is located on a low-voltage side of the output circuit.

3. The discharge protection circuit according to claim 1, wherein the cell combination comprises more than one series-connected unit, each of the series-connected units forming a series connection there between, each of the series-connected unit comprising more than one cell, and the cells in a common same series-connected unit being connected in parallel; a plurality of voltage sampling circuits being disposed between the voltage detection circuit and the cell combination, each voltage sampling circuit being provided with a sampling control switch, and the voltage sampling circuit being electrically connected to a high-voltage end of the series-connected unit.

4. The discharge protection circuit according to claim 3, wherein, that when one sampling control switch is turned on, the remaining sampling control circuits are all turned off.

5. The discharge protection circuit according to claim 1, wherein the drive switch is a MOSFET switch.

* * * * *